United States Patent Office 3,457,048
Patented July 22, 1969

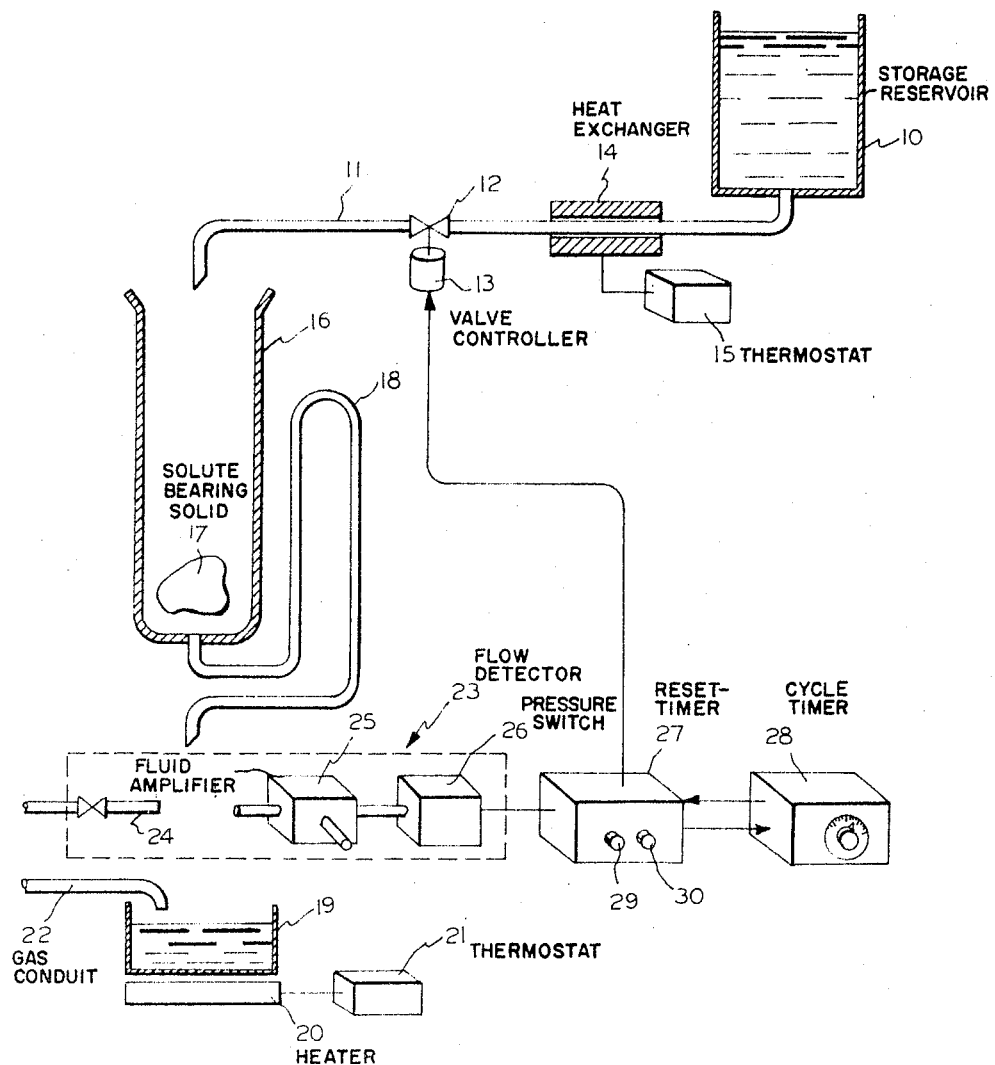

3,457,048
EXTRACTOR
Bernard B. Stephens and Robert L. Conder, Newport News, Va., assignors to The Dow Chemical Company, Midland, Mich., a corporation of Delaware
Filed Aug. 5, 1966, Ser. No. 570,464
Int. Cl. B01d 11/02
U.S. Cl. 23—272.6       9 Claims

ABSTRACT OF THE DISCLOSURE

An extraction apparatus comprising a vessel (16) supplied with solvent via a solvent conduit (11) having a valve (12) drained by a siphon (18). A tube (24) is adapted to direct a stream of gas to intersect flow of solution from the vessel (16). A fluid amplifier (25), pressure switch (26), reset-timer (27), cycle timer (28), and valve controller (13) constitute a push button system which can be preset to automatically perform a given number of extractions.

---

This invention relates to extractors and, particularly, to an apparatus for the solvent-extraction of a solute from a solute-bearing solid and an automatic control means for the apparatus.

Prior art extractors employing an extraction vessel and a siphon are well-known. These devices generally comprise an extraction vessel adapted to hold the solute-bearing solid which is to be extracted and a siphon in liquid communication with the extraction vessel. The siphon discharges into a closed flask which is provided with heating means to vaporize the solvent. The solvent vapors are carried away by a conduit terminating in a condenser. Usually, the condenser condenses the solvent vapor and returns the condensed solvent to the extraction vessel. In operation, the solid to be extracted is placed in the extraction vessel and heat is applied to the solvent in the flask. As the solvent evaporates, it is condensed by the condenser and returned to the exeraction vessel. The level of the solvent in the extraction vessel rises until the liquid level in the extraction vessel is equal to the top of the siphon. As the condenser continues to supply more solvent to the extraction vessel, the liquid level in the extractor continues to rise, priming the siphon, thus causing the siphon to empty the extraction vessel. In order to recover the solute extracted from the solid, it is necessary to remove the flask and evaporate the solvent, leaving behind the solute, which may then be analyzed according to approprite, well-known analytical methods.

The above-described prior art apparatus is very time-consuming in operation since it is necessary to reevaporate all the solvent from one extraction cycle before beginning the next cycle. It is further necessary, after completion of the extraction process, to again evaporate the solution to dryness in order to recover the solute for analysis.

Accordingly, it is an object of this invention to provide a new and useful apparatus which overcomes the disadvantages of the prior art.

Another object of this invention is to provide an extractor which is economical in operation.

A further object of this invention is to provide an extractor in which it is unnecessary to re-evaporate the solvent after completion of the extraction process.

Still another object of this invention is to provide an extractor that automatically extracts a solute from a solute-bearing solid a given number of times and yields the solute in solvent-free form for further analysis.

Other objects and advantages of the present invention will be apparent to those of ordinary skill in the art upon consideration of the following detailed description and drawing showing a preferred embodiment.

Referring now to the figure of the drawing, there is shown a storage reservoir 10 adapted to hold a quantity of solvent sufficient for the desired number of extraction cycles. A solvent conduit 11 is in liquid communication with the storage reservoir 10. The solvent conduit 11 contains a valve 12 which may be opened or closed to control the solvent flow. The valve 12 is automatically closed or opened by a valve controller 13, the purpose and function of which will be more completely described below. The valve controller 13 and the valve 12 may conveniently be a unit comprising a normally closed, solenoid-operated valve. In one embodiment, the solvent conduit 11 may be provided with a heat-exchanger 14 if it is desired to perform the extraction processes with solvent at super-ambient temperatures. The temperature of the heat-exchanger and, therefore, the temperature of the solvent in the solvent conduit 11 may be controlled by a heat-changer thermostat 15. The solvent conduit 11 discharges into an extraction vessel 16 which is adapted to contain a solute-bearing solid 17. The extraction vessel 16 discharges through a siphon conduit 18. The top of the siphon conduit 18 is maintained at a level above the top of the solid 17 to ensure that the solvent completely covers the solid 17. The siphon conduit 18 discharges into a solution receiving vessel 19 which may be heated by any convenient heater 20 the temperature of which may be controlled by a heater thermostat 21, to effect evaporation of the solvent from the solution leaving the solute. The solution receiving vessel 19 is also provided with a gas conduit 22. Air or other gas introduced through the gas conduit 22 is direcied into the solution receiving vessel 19 from a source not shown, and is instrumental in increasing the rate of evaporation from the solution receiving vessel 19. The solution receiving vessel 19 may conveniently be replaceable, permitting easy analysis of the solute in the same vessel. The extractor is provided with a flow detector 23 which is responsive to the flow of solution from the extraction vessel 16. The flow detector 23 is constructed to deliver an output signal responsive to flow from the extraction vessel 16. The flow detector 23 comprises, in one embodiment of the instant invention, a tube 24, a fluid amplifier 25, and a pressure switch 26. The tube 24 is adapted to direct a stream of gas such as low pressure air from a source not shown, into the fluid amplifier 25. The tube 24 is arranged such that the stream of solution from the extraction vessel 16 interrupts the stream of gas from the tube 24. When the flow of gas from the tube 24 is interrupted, the fluid amplifier 25 senses a reduction in pressure and delivers a pneumatic output signal to the pressure switch 26. The pressure switch 26 is adapted to produce an electrical output signal in response to the pneumatic input signal. The fluid amplifier 25 is available as Model TA–4S "Turbulence Amplifier," and the pressure switch is available as Model DA–15, "Switch Diaphragm Actuator," both from the Howie Corporation. The output signal from the flow detector 23 constitutes an input to a reset-timer 27. The reset-timer 27 is avaiiable from the Eagle Supply Corporation as Model No. HP53 A6, and is called a "Cycle-Flex Reset Timer."

The rest-timer 27 has three functions, the first of which is to deliver a signal to the valve controller 13 in response to the output signal of the flow detector 23. Thus, in opeartion, by means of the reset-timer 27 the valve 12 is closed by the valve controller 13 in response to the output signal from the fiow detector 23. The second function of the reset-timer 27 is to maintain the valve 12 in its closed position for a predetermined time after commencement of flow from the extraction vessel 16 as sensed by the flow detector 23. This is accomplished by means of an internal timer which may be set for any appropriate period of time such as from less than one second to several minutes. Five to ten seconds has been found adequate for most solvents to ensure that the valve 12 remains closed until the extraction vessel 17 is empty. The third function of the reset-timer 27 is to deliver a signal to a cycle counter 28. The reset-timer 27 is provided with a start button 29 to start the extractor and a stop button 30 to terminate its operaion. The cycle counter 28 is available from the Presin Company, Inc., as Model No. F 185 and is termed an "Adding Predetermining Pulse Counter." The cycle counter 28 may be preset by the operator for a given number of cycles. Each time a signal is received from the reset-timer 27, the cycle counter 28 indexes one cycle. After the reset-timer 27 has signalled the cycle counter 28 a number of times equal to the number of cycles preset, the cycle counter 28 will prevent the reset-timer 27 from again opening the valve 12.

In operation, the valve 12 is closed and the heat-exchanger thermostat 15 and the heater thermostat 21 are set at their desired temperatures. Gas is caused to flow through gas conduit 22 from a source not shown. The solute-bearing solid 17 is placed in the extractor vessel 16. A quantity of the desired solvent equal to at least the volume of solvent required for one extraction cycle times the number of extraction cycles is placed in the storage reservoir 10. The cycle counter 28 is placed on the number corresponding to the desired number of extraction cycles. In accordance with experience from previous runs, the timer of the reset-timer 27 is preset to ensure that the valve 12 is not reopened until a sufficient time has passed to permit the siphon conduit 18 to empty the extraction vessel 16.

The extractor is started by pushing start button 29 on reset-timer 27. The reset-timer 27 then opens the valve 12 by means of the valve controller 13. This permits solvent to flow from the storage reservoir 10 into the solvent conduit 11 where the solvent may be heated by the heat-exchanger 14 to a predetermined temperature. The solvent discharges from the solvent conduit 11 into the extraction vessel 16, contacting the solid 17 and extracting the solute. As the solvent continues to enter the extraction vessel 16, the solvent level continues to rise, completely covering the solid 17. The solvent level continues to rise until it reaches the top of the siphon conduit 18. As the solvent level rises still further, the siphon conduit 18 is primed, causing the solution to flow through the siphon conduit 18 and into the solution receiving vessel 19, thus completing one extraction cycle. The heat from the evaporator heater 20 in combination with the gas issuing from the gas conduit 22 causes the solvent to evaporate, leaving the solute remaining in the solution receiving vessel 19. Simultaneously with the beginning of flow through the siphon conduit 18, the flow detector 23 signals the reset-timer 27 which immediately does three things: first it closes the valve 12 by means of the valve controller 13, second it activates its own timer, and third it signals the cycle counter 28 which indexes. As the level of the solution in the extraction vessel 16 goes down, the siphon conduit 18 eventually draws air, loses its prime, and stops. In accordance with proper presetting of the reset-timer 27, at some time after flow has ceased from the extraction vessel 16 the reset-timer 27 will reopen the valve 12, thus beginning another extraction cycle. The extraction cycles will continue one after another until the cyle counter 28 shuts down the apparatus responsive to the number of cycles preset.

In the above-described embodiment, the flow detector 23 employs a pneumatic signal and a pressure switch 26 which operates as a transducer to convert the pneumatic signal into an electrical signal which constitutes an input signal for the reset-timer 27. This is necessary when the reset-timer 27 operates on an electrical rather than a pneumatic system but, of course, both systems, as well as other systems, are contemplated within the scope of the present invention.

Thus, from the foregoing, it is seen that in the extractor of the present invention it is unnecessary to evoporate the solvent from one extraction cycle before beginning the next cycle. It is also unnecessary to evaporate the solution in order to recover the solute for analysis. The opeartor of the extractor has only to set up the apparatus and return later to find the dry solute in the solution receiving vessel 19. The ease of operation and the attendant wage savings make the extractor of the present invention very economical in operation.

The extractor of the present invention is useful to extract solute from all types of solids. It is especially useful to extract finishing materials or surface-applied agents from woven or non-woven fabrics. It has been found that the agitation of the solution in the extraction vessel 16 caused by the addition of solvent through the solvent conduit 11 is normally sufficient to extract substantially all the solute from the solid in a small number of cycles, usually less than ten. However, if desired, agitation may be increased by providing the extraction vessel 16 with a stirrer or other agitation means.

When a toxic solvent is employed, the solution receiving vessel 19 should be placed under a properly ventilated exhaust hood (not shown). If it is desired to recover the solvent, the solution receiving vessel may be constructed in such a manner to permit collection and condensation of the solvent vapors.

It will be obvious to those of ordinary skill in the art that many modifications of the present invention may be made without departing from the spirit and scope thereof.

What is claimed is:

1. An extraction apparatus comprising, in combination: (a) an extraction vessel adapted to contain a solute-bearing solid; (b) a solvent conduit adapted to discharge solvent from storage into said extraction vessel through said conduit; (c) a valve in operative relationship with said conduit and adapted to control the flow of solvent through said conduit and into said extraction vessel; (d) a siphon conduit in operative relationship with and adapted to periodically drain solution from said extraction vessel; (e) tube means for directing a stream of gas in a path intersecting the path of solution draining from said extraction vessel; and (f) means for sensing said gas stream and for automatically closing said valve in response to commencement of flow of liquid from said extraction vessel, and for automatically opening said valve responsive to completion of flow of liquid from said extraction vessel.

2. An extraction apparatus comprising, in combination: (a) an extraction vessel adapted to contain a solute-bearing solid; (b) a solvent conduit adapted to discharge solvent from storage into said extraction vessel through said conduit; (c) a valve in operative relationship with said conduit and adapted to control the flow of solvent through said conduit and into said extraction vessel; (d) a siphon conduit in operative relationship with and adapted to periodically drain solution from the bottom of said extraction vessel; (e) a solution receiving vessel positioned beneath the discharge end of said siphon conduit; (f) a tube connected to a gas pressure source arranged to direct a stream of gas across the path of the stream of solution discharged from the end of said siphon conduit; (g) a fluid pressure amplifier positioned to receive said stream of gas and generate a pneumatic signal in response to a reduction in gas pressure due to interruption of the air stream by solution discharging from said siphon conduit; (h) a pressure switch operatively connected with the fluid amplifier to generate an electrical signal in response to the pneumatic signal; (i) a reset-timer operatively connected to the pressure switch to generate a first signal in response to the electrical signal and to generate a second signal after a predetermined time; (j) a valve controller adapted to receive the first signal from the reset-timer and close the valve after commencement of flow of solution from the siphon conduit, and to receive the second signal from the reset-timer and open the valve when flow of solution from the siphon conduit is complete.

3. The apparatus of claim 1 in which said means for closing said valve and for opening said valve together comprise (a) a flow detector responsive to solution flow from the extraction vessel and adapted to produce an output signal; (b) a reset-timer adapted to receive the output signal of the flow detector, the reset-timer being adapted to effect closing of the valve and further adapted to effect reopening of the valve after a predetermined time.

4. The apparatus of claim 2 in which the reset-timer has a cycle counter in operable connection with the reset-timer, the cycle counter being adapted to terminate the operation of the reset-timer after a given number of cycles.

5. The apparatus of claim 1 further comprising a solution receiving vessel adapted to recover solution from said siphon conduit.

6. The apparatus of claim 5 in which said solution receiving vessel is replaceable.

7. The apparatus of claim 5 in which said solution receiving vessel is adapted to evaporate the solvent from the solution, leaving the solute.

8. The apparatus of claim 7 which further comprises a gas conduit adapted to direct a stream of gas into said solution receiving vessel whereby the rate of evaporation of the solvent from the solution is increased.

9. The apparatus of claim 1 further comprising means for automatically terminating operation of the apparatus after a given number of extractions.

References Cited

UNITED STATES PATENTS

| | | | |
|---|---|---|---|
| 737,625 | 9/1903 | Herreshoff | 23—272 X |
| 1,746,525 | 1/1930 | Darrah | 23—272 X |
| 1,942,848 | 1/1934 | Taylor | 23—272.6 X |
| 2,864,396 | 12/1958 | Isreeli | 222—416 X |
| 3,227,312 | 1/1966 | Solvik | 222—52 |
| 3,253,740 | 5/1966 | Keyes | 222—52 |
| 3,259,462 | 7/1966 | Anscherlik | 222—416 X |
| 3,284,164 | 11/1966 | Hock | 23—230 X |
| 3,332,744 | 7/1967 | Henderson | 23—230 |
| 3,352,267 | 11/1967 | Brandriff | 137—81.5 X |

NORMAN YUDKOFF, Primary Examiner

S. J. EMERY, Assistant Examiner

U.S. Cl. X.R.

23—259; 137—132; 222—416